United States Patent Office 3,661,956
Patented May 9, 1972

3,661,956
POLYMERISED FATTY ACIDS AND THEIR ESTERS
Gerald Alfred Silverstone, Sale, England, assignor to Victor Wolf Limited, Manchester, England
No Drawing. Continuation-in-part of application Ser. No. 544,815, Apr. 25, 1966. This application May 1, 1969, Ser. No. 821,127
Int. Cl. C09f 7/06
U.S. Cl. 260—407
4 Claims

ABSTRACT OF THE DISCLOSURE

Alkyl esters of dimeric and polymeric fatty acids are produced by heating an alkyl ester of a hydroxy acid in a liquid hydrocarbon solvent which forms an azeotrope with water and in the presence of a dehydration catalyst selected from acid and alkaline clays, inorganic oxides, ion exchange resins and acid sulphates, thereby simultaneously dehydrating and polymerising the ester.

---

This application is a continuation-in-part of application No. 544,815 filed Apr. 25, 1966 now abandoned.

The present invention relates to a new method of preparing dimerised or more highly polymerised higher fatty acids or their esters.

The polymerisation of unsaturated fatty acids, either by purely thermal means or by the use of acid catalysts is well known. A suitable starting material for the manufacture of dimeric or polymeric acids is dehydrated castor oil fatty acid which is a mixture of higher fatty acids rich in linoleic acid present in the form of several isomers. These isomers are produced by the dehydration of the ricinoleic acid in the form of the glycerides present as the major constituent of castor oil.

The dehydration of ricinoleic acid, either as glycerides in castor oil or as free acid, may be carried out using such catalysts as $NaHSO_4$, metallic oxides or other dehydrating agents or by the pyrollitic splitting of ricinoleic acid (or its esters) in which the hydroxyl group is esterified as a preliminary stage. The polymerisation of castor oil under conditions of dehydration has not hitherto been considered a useful means of manufacture of polymerised fatty acid. Further, although the dehydration of ricinoleic acid is frequently carried out, the dehydration of simple esters, for example, the methyl ester, of ricinoleic acid, either in its pure state or as the ester of castor oil fatty acid has not been described in the industrial art because, under conditions of dehydration of the hydroxyl group, the presence of water of reaction and of an active catalyst would result in hydrolysis of the ester group present to a large extent.

An object of the present invention is to provide a novel process of preparing dimerised and polymerised fatty acids.

A further object of the invention is to provide a novel process using a catalyst.

A further object of the invention is to provide a novel process of preparing dimerised and polymerised fatty acids from certain hydroxy acids, particularly those combined in castor oil.

Still further objects and the entire scope of applicability of the present invention will become apparent from the detailed description given hereinafter, it should be understood, however, that the detailed description and specific examples, while indicating the preferred embodiments of the invention, are given by way of illustration only, since various changes and modifications within the spirit and scope of the invention will become apparent to those skilled in the art from this detailed description.

The above objects of the invention are achieved by the production of an ester of the hydroxy acid, particularly ricinoleic acid as the free acid or as castor oil by ester interchange techniques using an alcohol containing from 1 to 8 carbon atoms, for example, methanol and a suitable esterification catalyst after which the esters so produced, are treated with dehydration catalyst.

The dehydration catalyst is a heterogeneous catalyst selected from acid and alkaline clays, inorganic oxides, ion exchange resins and acid sulphates. Examples of suitable catalysts are $NaHSO_4$ and the so-called "Surrey Powder." The process is carried out in the presence of an organic liquid hydrocarbon solvent which forms an azeotrope with water e.g. xylene. A suitable amount of catalyst is from 1% to 30% by weight of the ester. The esters are dehydrated to esters of the corresponding dienoic acid, which in the case of ricinoleic acid is linoleic acid. In the presence of the said catalyst, the dienoic acid dimerises and polymerises to give a good yield of a polymerised fatty acid ester. The fatty acid ester undergoes scarcely any saponification during the reaction since the water of dehydration is constantly removed from the reaction by the azeotroping solvent.

The reaction is carried out at a temperature within the range of 120° to 300° C., particularly between 150° and 250° C. As water is removed as an azeotrope the boiling point rises and ultimately the liquid refluxes at the boiling point of the solution which is in excess of that of the solvent alone.

The mixture of dimerised, polymerised and unchanged monomeric esters together with the azeotroping solvent, is freed from the catalyst, for example, by filtration or washing, and distilled to remove solvent and monomeric esters. The residue consists mainly of dimerised fatty acid esters, together with some residual monomer and some more highly polymerised esters. The monomeric esters recovered from the reaction are of industrial value and may be used as such or reprocessed to give more polymer. The products may, if desired, be hydrolysed to the free acids.

Hydroxy acids which may be used in the process of the present invention are the various dihydroxy carboxylic acids such as 10,12-dihydroxy stearic acid so long as they produce a dienoic acid on dehydration. However the preferred hydroxy acid is a mono-hydroxy mono-unsaturated aliphatic carboxylic acid, such as ricinoleic acid, used either as pure acid or as castor oil.

A preferred technique which results in a product having an improved ratio of dimer to polymer, comprises adding the hydroxy acid ester to a stirred and refluxing suspension of catalyst in the azeotroping hydrocarbon solvent.

I have surprisingly found that by using the process according to the present invention a product is obtained having a dimer/polymer ratio of about 4 or above, since conventional techniques for simultaneous dehydration and polymerisation produce only highly bodied oils.

The invention is further illustrated by, but in no manner limited to, the following examples. In the examples A.V. refers to acid value.

EXAMPLE 1

100 gms. of the methyl esters of castor oil fatty acids were stirred in 50 mls. of xylene containing 10 gms. of dried Filtrol 13 (Filtrol 13 is a product of the Filtrol Coroporation) at a temperature of 180° C. for 1 hour during which the water of reaction was continuously removed as an azeotrope with the boiling xylene which was returned to the reaction. The product was freed from catalyst by filtration and from xylene by distillation after which monomer was stripped from the product by distillation at 0.2 mm. pressure until the kettle temperature was 270° C. The polymerised residue consisted of 48.4% of the product and had a ratio of dimer to more highly polymerised esters of 3.9 (as determined by the method of Paschke et al. J. Am. Oil Chem. Soc., 1954, 31, 5).

The acid value of the polymerised fraction was 7.9 and of the recovered monomer 4.4 and both had zero hydroxyl value (a sample of residue was re-esterified to A. V. of less than 1 prior to analysis for dimer and polymer).

EXAMPLE 2

This example illustrates another feature of the invention namely the ability to vary dimer/polymer ratio in the product by modification of the technique of mixing the ingredients. Thus I have found that if the ester of ricinoleic acid is added to the stirred and refluxing suspension of catalyst in the azeotroping solvent an improvement in dimer/polymer ratio comes about.

To a stirred suspension of 100 gms. of dried Filtrol 13 in 200 mls. of xylene under reflux at 140° C. was added 500 gms. of technical methyl ricinoleate over a period of 53 mins. during which the theoretical quantity of water of reaction was removed and the temperature of the mixture rose to 184° C. After a further 5 minutes stirring and refluxing the mixture was cooled, filtered and the filter cake washed with xylene to remove absorbed product. The combined filtrates were distilled first to remove solvent and then at 0.2 mm. pressure until the kettle temperature was 270° C. to remove unreacted monomer. The yield of polymerised ester was 51.8% and contained some monomeric esters and had a dimer to polymer ratio of 5.6. The A.V. of the residue was 7.1 and of the recovered monomer 3.8.

EXAMPLE 3

This example illustrates re-use of the clay catalyst. Catalyst recovered from Example 2 was re-used under the same conditions to give 35% yield of polymerised product with dimer/polymer ratio of 5.0. The same catalyst was used a third time when a reaction time of 150 minutes was required the yield again being 33% and the dimer/polymer ratio 5.2.

EXAMPLE 4

100 gms. of technical methyl ricinoleate was treated with 10 gms. of dried Filtrol 13 in 50 ml. of xylene as in Example 2 but only 20 mins. was required for mixing of the ingredients. At the end of the addition xylene was distilled away and the reaction continued with stirring under a nitrogen atmosphere at 250° C. for 4 hours. On working up as usual a product of A.V. 25.5 and having a dimer/polymer ratio of 4.2 was obtained in 65.0% yield.

The improved yield was only obtained at the expense of increasing the acid value.

EXAMPLE 5

100 gms. of technical methyl ricinoleate was stirred with 50 mls. xylene containing 20 gms. of dried alkaline earth "Surrey Powder" (from the Fullers Earth Union,) for 4 hours under reflux at 185° C. Water of reaction was removed as the azeotrope and the product worked up as in Example 1. The yield of polymerised ester was 27.3%, the A.V. being 1.5 and the dimer/polymer ratio 5.6.

According to the provisions of the patent statutes there are described above the invention and what are now considered to be its best embodiments; however, it is to be understood that the invention can be practiced otherwise than as specifically described.

I claim:
1. A method for the manufacture of alkyl esters of dimeric and polymeric ricinoleic acid in a dimer/polymer ratio of at least 3.9 which comprises reacting by refluxing an alkyl ester of ricinoleic acid, wherein the alkyl group contains from 1 to 8 carbon atoms at a temperature of from 120° C. to 300° C. in xylene which forms an azeotrope with water and in the presence of 1% to 30% by weight of a clay catalyst.
2. The method according to claim 1 wherein the alkyl ester of ricinoleic acid is the methyl ester.
3. The method according to claim 1 wherein the temperature is between 150° and 250° C.
4. The method according to claim 1 wherein the alkyl ester of ricinoleic acid is added to a stirred and refluxing suspension of the catalyst in xylene.

References Cited
UNITED STATES PATENTS

| | | | |
|---|---|---|---|
| 3,239,546 | 3/1966 | Rogier | 260—407 X |
| 2,804,467 | 8/1957 | Grummitt | 260—405.5 |
| 2,345,358 | 3/1944 | Rheineck et al. | 260—405.5 |
| 2,282,892 | 5/1942 | Schwarcman | 260—407 |

OTHER REFERENCES

Schwern: "Bailey's Industrial Oil and Fat Products," 1964, pp. 1055–7.

Chen et al.: "Activated Taiwan Clays as Catalysts for the Preparation of Dehydrated Castor Oil," Chem. Abst., vol. 49 (1955), 1347e.

Maruta et al.: "Vapor-Phase Dehydration of Methyl Ricinoleate," Chem. Abst., vol 51 (1957), 17729g.

LEWIS GOTTS, Primary Examiner

C. L. MILLS, Assistant Examiner

UNITED STATES PATENT OFFICE
CERTIFICATE OF CORRECTION

Patent No. 3,661,956          Dated May 9, 1972

Inventor(s) GERALD ALFRED SILVERSTONE

It is certified that error appears in the above-identified patent and that said Letters Patent are hereby corrected as shown below:

In the heading

---Claims priority, application British, May 12, 1965, 19,970---

Signed and sealed this 26th day of December 1972.

(SEAL)
Attest:

EDWARD M. FLETCHER, JR.        ROBERT GOTTSCHALK
Attesting Officer              Commissioner of Patents